United States Patent
Shin et al.

(10) Patent No.: US 6,493,387 B1
(45) Date of Patent: Dec. 10, 2002

(54) MOVING PICTURE CODING/DECODING METHOD AND APPARATUS HAVING SPATIALLY SCALABLE ARCHITECTURE AND SIGNAL-TO-NOISE RATIO SCALABLE ARCHITECTURE TOGETHER

(75) Inventors: Jae-seob Shin, Seoul (KR); Se-hoon Son, Seoul (KR); Dae-sung Cho, Seoul (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/546,658

(22) Filed: Apr. 10, 2000

(51) Int. Cl.[7] .................................................. H04N 7/12
(52) U.S. Cl. .................................. 375/240.1; 375/240.2
(58) Field of Search ........................... 348/42, 554, 699; 375/240.03, 240.08–240.12, 240.18–240.2, 240.24; 382/217, 236, 242, 243, 248–250; H04N 7/12, 7/32

(56) References Cited

U.S. PATENT DOCUMENTS

| | | | | |
|---|---|---|---|---|
| 5,349,383 A | * | 9/1994 | Parke et al. | 375/240.1 |
| 5,828,788 A | * | 10/1998 | Chiang et al. | 375/240.12 |
| 5,995,150 A | * | 11/1999 | Hsieh et al. | 375/240.12 |
| 6,043,838 A | * | 3/2000 | Chen | 348/42 |
| 6,057,884 A | * | 5/2000 | Chen et al. | 375/240.16 |
| 6,233,356 B1 | * | 5/2001 | Haskell et al. | 375/240.11 |
| 6,256,346 B1 | * | 7/2001 | Yamaguchi et al. | 375/240.18 |
| 6,263,022 B1 | * | 7/2001 | Chen et al. | 375/240.03 |
| 6,285,788 B1 | * | 9/2001 | Sezan et al. | 382/217 |
| 6,377,309 B1 | * | 4/2002 | Ito et al. | 348/554 |

* cited by examiner

Primary Examiner—Richard Lee
(74) Attorney, Agent, or Firm—Burns, Doane, Swecker & Mathis LLP

(57) ABSTRACT

A moving picture coding/decoding method and apparatus having a spatially scalable architecture and a signal-to-noise ratio (SNR) scalable architecture together is provided. The coding method includes the steps of down sampling shape information and texture information by a predetermined ratio to construct a spatially scalable architecture including a single base layer and at least one enhancement layer; coding the shape and texture information of the base layer to generate a base layer bitstream, frequency transform coding the difference between decoded texture information and original texture information, and constructing a SNR scalable architecture based on frequency bands; and, with respect to each of the at least one enhancement layer, coding the difference between shape information upsampled from the base layer and the shape information of the enhancement layer to generate an enhancement layer bitstream, frequency transform coding the difference between the decoded texture information obtained and the texture information of the enhancement layer, and constructing a SNR scalable architecture based on frequency bands. Accordingly, various picture quality information of a different size can be provided with respect to an arbitrary shaped object through a single bitstream.

23 Claims, 7 Drawing Sheets

MEL_k0:
  A00,B00,C00,D00

MEL_k1:
  A01,B01,C01,D01,A10,B10,C10,D10,A11,B11,C11,D11

MEL_k2:
  A02,B02,C02,D02,A20,B20,C20,D20,A12,B12,C12,
  D12,A21,B21,C21,D21,A22,B22,C22,D22,

MEL_k3:
  A03,B03,C03,D03,A30,B30,C30,D30,A13,B13,C13,D13,
  A31,B31,C31,D31,A23,B23,C23,D23,A32,B32,C32,D32,
  A33,B33,C33,D33,

MEL_k4:
  A04,B04,C04,D04,A40,B40,C40,D40,A14,B14,C14,D14,
  A41,B41,C41,D41,A24,B24,C24,D24,A42,B42,C42,D42,
  A34,B34,C34,D34,A43,B43,C43,D43,A44,B44,C44,D44

MEL_k5:
  A05,B05,C05,D05,A50,B50,C50,D50,A15,B15,C15,D15,
  A51,B51,C51,D51,A25,B25,C25,D25,A52,B52,C52,D52,
  A35,B35,C35,D35,A53,B53,C53,D53,A45,B45,C45,D45,
  A54,B54,C54,D54,A55,B55,C55,D55

MEL_k6:
  A06,B06,C06,D06,A60,B60,C60,D60,A16,B16,C16,D16,
  A61,B61,C61,D61,A26,B26,C26,D26,A62,B62,C62,D62,
  A36,B36,C36,D36,A63,B63,C63,D63,A46,B46,C46,D46,
  A64,B64,C64,D64,A56,B56,C56,D56,A65,B65,C65,D65,
  A66,B66,C66,D66

MEL_k7:
  A07,B07,C07,D07,A70,B70,C70,D70,A17,B17,C17,D17,
  A71,B71,C71,D71,A27,B27,C27,D27,A72,B72,C72,D72,
  A37,B37,C37,D37,A73,B73,C73,D73,A47,B47,C47,D47,
  A74,B74,C74,D74,A57,B57,C57,D57,A75,B75,C75,D75,
  A67,B67,C67,D67,A76,B76,C76,D76,A77,B77,C77,D77

301:

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

302:

| B00 | B01 | B02 | B03 | B04 | B05 | B06 | B07 |
|-----|-----|-----|-----|-----|-----|-----|-----|
| B10 | B11 | B12 | B13 | B14 | B15 | B16 | B17 |
| B20 | B21 | B22 | B23 | B24 | B25 | B26 | B27 |
| B30 | B31 | B32 | B33 | B34 | B35 | B36 | B37 |
| B40 | B41 | B42 | B43 | B44 | B45 | B46 | B47 |
| B50 | B51 | B52 | B53 | B54 | B55 | B56 | B57 |
| B60 | B61 | B62 | B63 | B64 | B65 | B66 | B67 |
| B70 | B71 | B72 | B73 | B74 | B75 | B76 | B77 |

303:

| C00 | C01 | C02 | C03 | C04 | C05 | C06 | C07 |
|-----|-----|-----|-----|-----|-----|-----|-----|
| C10 | C11 | C12 | C13 | C14 | C15 | C16 | C17 |
| C20 | C21 | C22 | C23 | C24 | C25 | C26 | C27 |
| C30 | C31 | C32 | C33 | C34 | C35 | C36 | C37 |
| C40 | C41 | C42 | C43 | C44 | C45 | C46 | C47 |
| C50 | C51 | C52 | C53 | C54 | C55 | C56 | C57 |
| C60 | C61 | C62 | C63 | C64 | C65 | C66 | C67 |
| C70 | C71 | C72 | C73 | C74 | C75 | C76 | C77 |

304:

| D00 | D01 | D02 | D03 | D04 | D05 | D06 | D07 |
|-----|-----|-----|-----|-----|-----|-----|-----|
| D10 | D11 | D12 | D13 | D14 | D15 | D16 | D17 |
| D20 | D21 | D22 | D23 | D24 | D25 | D26 | D27 |
| D30 | D31 | D32 | D33 | D34 | D35 | D36 | D37 |
| D40 | D41 | D42 | D43 | D44 | D45 | D46 | D47 |
| D50 | D51 | D52 | D53 | D54 | D55 | D56 | D57 |
| D60 | D61 | D62 | D63 | D64 | D65 | D66 | D67 |
| D70 | D71 | D72 | D73 | D74 | D75 | D76 | D77 |

| E00 | E01 | E02 | E03 | E04 | E05 | E06 | E07 |
|-----|-----|-----|-----|-----|-----|-----|-----|
| E10 | E11 | E12 | E13 | E14 | E15 | E16 | E17 |
| E20 | E21 | E22 | E23 | E24 | E25 | E26 | E27 |
| E30 | E31 | E32 | E33 | E34 | E35 | E36 | E37 |
| E40 | E41 | E42 | E43 | E44 | E45 | E46 | E47 |
| E50 | E51 | E52 | E53 | E54 | E55 | E56 | E57 |
| E60 | E61 | E62 | E63 | E64 | E65 | E66 | E67 |
| E70 | E71 | E72 | E73 | E74 | E75 | E76 | E77 |

402

$MEL_k0$: E00
$MEL_k1$: E01,E10,E11
$MEL_k2$: E02,E20,E12,E21,E22
$MEL_k3$: E03,E30,E13,E31,E23,E32,E33
$MEL_k4$: E04,E40,E14,E41,E24,E42,E34,E43,E44
$MEL_k5$: E05,E50,E15,E51,E25,E52,E35,E53,E45,E54,E55
$MEL_k6$: E06,E60,E16,E61,E26,E62,E36,E63,E46,E64,E56,E65,E66
$MEL_k7$: E07,E70,E17,E71,E27,E72,E37,E73,E47,E74,E57,E75,E67,E76,E77

403

| F00 | F01 | F02 | F03 | F04 | F05 | F06 | F07 |
|-----|-----|-----|-----|-----|-----|-----|-----|
| F10 | F11 | F12 | F13 | F14 | F15 | F16 | F17 |
| F20 | F21 | F22 | F23 | F24 | F25 | F26 | F27 |
| F30 | F31 | F32 | F33 | F34 | F35 | F36 | F37 |
| F40 | F41 | F42 | F43 | F44 | F45 | F46 | F47 |
| F50 | F51 | F52 | F53 | F54 | F55 | F56 | F57 |
| F60 | F61 | F62 | F63 | F64 | F65 | F66 | F67 |
| F70 | F71 | F72 | F73 | F74 | F75 | F76 | F77 |

404

$MEL_k0$: F00
$MEL_k1$: F01,F10,F11
$MEL_k2$: F02,F20,F12,F21,F22
$MEL_k3$: F03,F30,F13,F31,F23,F32,F33
$MEL_k4$: F04,F40,F14,F41,F24,F42,F34,F43,F44
$MEL_k5$: F05,F50,F15,F51,F25,F52,F35,F53,F45,F54,F55
$MEL_k6$: F06,F60,F16,F61,F26,F62,F36,F63,F46,F64,F56,F65,F66
$MEL_k7$: F07,F70,F17,F71,F27,F72,F37,F73,F47,F74,F57,F75,F67,F76,F77

FIG. 7

MOVING PICTURE CODING/DECODING METHOD AND APPARATUS HAVING SPATIALLY SCALABLE ARCHITECTURE AND SIGNAL-TO-NOISE RATIO SCALABLE ARCHITECTURE TOGETHER

This disclosure is based on Korean Patent Application No. 98-42434 filed on Oct. 10, 1998, herein incorporated by reference;

BACKGROUND OF THE INVENTION

1. Field of the Invention

The present invention relates to data coding and decoding, and more particularly, to a moving picture coding/decoding method and apparatus, in each of which a spatially scalable architecture and a signal-to-noise ratio (SNR) scalable architecture are included together, for efficiently coding and transmitting video when an arbitrary shaped object continuously moves.

2. Description of the Related Art

Many coding/decoding methods which have been developed substantially relate to the coding/decoding of a quadrilateral picture of a predetermined size such as the screen of a television. Examples of these methods are a motion picture experts group (MPEG)-1, MPEG-2, H.261 and H.263.

Since most of the conventional coding methods only provide services of a quite limited hierarchical architecture, they cannot be positively adopted by an architecture in which the state of a transmission line frequently changes such as in an Internet/Intranet or a wireless network. MPEG-2 video (ISO/IEC JTC1/SC29/WG11 13818-2), which is a representative conventional coding method, proposes spatially scalable coding in which two spatially scalable architectures are provided and SNR scalable coding in which two or three scalable architectures are provided, with respect to a moving picture of a quadrilateral screen shape. However, the number of scalable layers is limited so that it is difficult to create a real application area from this method. Moreover, MPEG-4 video (ISO/IEC JTC1/SC29/WG11 14496-2) which provides efficient compression also proposes a coding method having a spatially scalable architecture and a temporal scalable architecture. However, a method for providing a SNR scalable architecture for a bitstream in the same spatial domain has not yet proposed, thereby limiting the quality of service.

SUMMARY OF THE INVENTION

To solve the above problems, an object of the present invention is to provide a moving picture coding/decoding method and apparatus for providing a SNR scalable coding function, which can variably determine picture quality in a predetermined space, as well as a spatially scalable coding function, so as to transmit data in different ways depending on the limitations of a transmission line or the receiving performance of a receiving terminal. The method and apparatus also provide scalable coding of an arbitrary shaped object as well as a quadrilateral picture, thereby providing various qualities of service.

To achieve the above object, in one embodiment, the present invention provides a method of constructing spatially and SNR scalable architectures with respect to input video data composed of the shape information and inner texture information of an object and then coding the input video data, the method including the steps of (a) down sampling the shape information and the texture information by a predetermined ratio to construct a spatially scalable architecture including a single base layer and at least one enhancement layer; (b) coding the shape and texture information of the base layer to generate a base layer bitstream, frequency transform coding the difference between decoded texture information and original texture information, and constructing a SNR scalable architecture based on frequency bands; and (c) with respect to each of the at least one enhancement layer, coding the difference between shape information upsampled from the base layer and the shape information of the enhancement layer to generate an enhancement layer bitstream, frequency transform coding the difference between the decoded texture information obtained in the step (b) and the texture information of the enhancement layer, and constructing a SNR scalable architecture based on frequency bands.

In another embodiment, the present invention provides a method of constructing spatially and SNR scalable architectures with respect to input video data composed of the shape information and inner texture information of an object and then coding the input video data, the method including the steps of (a) down sampling the shape information and the texture information to construct a spatially scalable architecture including a single base layer, which is obtained by down sampling by a first ratio, and at least one enhancement layer, which is obtained by down sampling by a second ratio that is smaller than that adopted for the base layer; (b) with respect to the shape information and texture information of the base layer, (b1) shape coding the shape information of the base layer; (b2) padding, frequency transform coding and quantizing the texture information of the base layer; (b3) collecting and variable length coding the data generated in the steps (b1) and (b2) to generate a base layer bitstream; (b4) obtaining the difference between texture information reproduced by dequantizing and inverse frequency transforming the data generated in the step (b2) and the texture information of the base layer; (b5) frequency transform coding the difference obtained in the step (b4) and classifying the results of the frequency transform coding by frequency to generate bitstreams based on frequency bands; (c) with respect to the shape and texture information of each enhancement layer, (c1) shape coding and variable length coding the difference between the shape information of the enhancement layer and shape information obtained by upsampling the shape information of the base layer to the enhancement layer, to generate an enhancement layer bitstream; (c2) obtaining the difference between the texture information of the enhancement layer and texture information obtained by upsampling the texture information reproduced in the step (b4) to the enhancement layer and padding the result of the upsampling; and (c3) frequency transform coding the difference obtained in the step (c2) and classifying the results of the frequency transform coding by frequency to generate bitstreams based on frequency bands.

To achieve the above object, the present invention also provides a method of decoding a bitstream, which has been coded in spatially and SNR scalable architectures. The method includes the steps of (a) variable length decoding the bitstream to divide it into a base layer bitstream and at least one enhancement layer bitstream; (b) shape decoding coded shape information contained in the base layer bitstream to generate base layer shape information; (c) dequantizing and inverse frequency transforming coded texture information contained in the base layer bitstream to generate base layer texture information; (d) sequentially inverse frequency transforming bitstreams selected from the SNR scalable architecture of the base layer bitstream and adding the results to the base layer texture information; and (e) with respect to at least one selected enhancement layer, sequentially repeating the steps of: (e1) upsampling the shape information of a spatial reference layer to the enhancement layer; (e2) upsampling the texture information of a SNR reference layer which falls under a spatial reference layer; (e3) shape decoding enhancement layer shape information contained in the enhancement layer bitstream and adding the result to the upsampled shape information of the lower layer; and (e4) sequentially inverse frequency transforming bitstreams selected from the SNR scalable architecture of the enhancement layer bitstream and adding the results to the upsampled texture information of the lower layer.

This method also includes the step of previously decoding a spatial reference layer identifier and a SNR reference layer identifier before the step (e1). The spatial reference layer is a layer immediately below the enhancement layer. The SNR reference layer is a SNR base layer which falls under the spatial reference layer. In another aspect, the SNR reference layer is a highest SNR layer which falls under the spatial reference layer.

Further, the present invention provides an apparatus for constructing spatially and SNR scalable architectures with respect to input video data composed of the shape information and inner texture information of an object and then coding the input video data. The apparatus includes a down sampling unit for down sampling the shape information and the texture information to construct a spatially scalable architecture including a single base layer, which is obtained by down sampling by a first ratio, and at least one enhancement layer, which is obtained by down sampling by a second ratio that is smaller than that adopted for the base layer; a base layer coder comprising a first shape coder for shape coding the shape information of the base layer; a texture coder for padding, frequency transform coding and quantizing the texture information of the base layer; a first variable length coder for collecting and variable length coding the data output from the first shape coder and the texture coder, to generate a base layer bitstream; a texture decoder for dequantizing and inverse frequency transforming the data output from the texture coder, to reproduce texture information; a first difference image generator for generating the difference between the reproduced texture information from the texture decoder and the texture information of the base layer; and a first SNR scalable architecture generator for frequency transform coding the difference generated by the first difference image generator and classifying the results of the frequency transform coding by frequency, to generate bitstreams based on frequency bands; and at least one enhancement layer coder comprising an upsampling unit for upsampling the shape information of the base layer to the enhancement layer and upsampling the texture information reproduced by the texture decoder to the enhancement layer; a second shape coder for shape coding the difference between the upsampled shape information and the shape information of the enhancement layer; a second variable length coder for variable length coding the output data of the second shape coder to generate an enhancement layer bitstream; a second difference image generator for obtaining the difference between the texture information of the enhancement layer and texture information obtained by padding the output data of the upsampling unit; and a second SNR scalable architecture generator for frequency transform coding the difference generated by the second difference image generator and classifying the results of the frequency transform coding by frequency to generate bitstreams based on frequency bands.

To achieve the above object, the present invention provides an apparatus for decoding a bitstream, which has been coded in spatially and SNR scalable architectures. The apparatus includes a variable length decoder for variable length decoding the bitstream to divide it into a base layer bitstream and at least one enhancement layer bitstream; a base layer decoder comprising a first shape decoder for shape decoding coded shape information contained in the base layer bitstream to generate base layer shape information; a texture decoder for dequantizing and inverse frequency transforming coded texture information contained in the base layer bitstream to generate base layer texture information; and a first SNR scalable architecture decoder for sequentially inverse frequency transforming selected bitstreams in the SNR scalable architecture of the base layer bitstream and adding the results to the base layer texture information; and at least one enhancement layer decoder comprising an upsampling unit for upsampling the shape and texture information of a layer immediately below the enhancement layer in a spatially scalable architecture, to the enhancement layer; a second shape decoder for shape decoding enhancement layer shape information contained in the enhancement layer bitstream and adding the result to the upsampled shape information of the lower layer; and a second SNR scalable architecture decoder for sequentially inverse frequency transforming bitstreams selected from the SNR scalable architecture of the enhancement layer bitstream and adding the results to the upsampled texture information of the lower layer.

BRIEF DESCRIPTION OF THE DRAWINGS

The above object and advantage of the present invention will become more apparent by describing in detail preferred embodiments thereof with reference to the attached drawings in which:

FIG. 5 illustrates sets of frequency components constructing layers of luminance information;

DETAILED DESCRIPTION OF THE INVENTION

Figure 1:
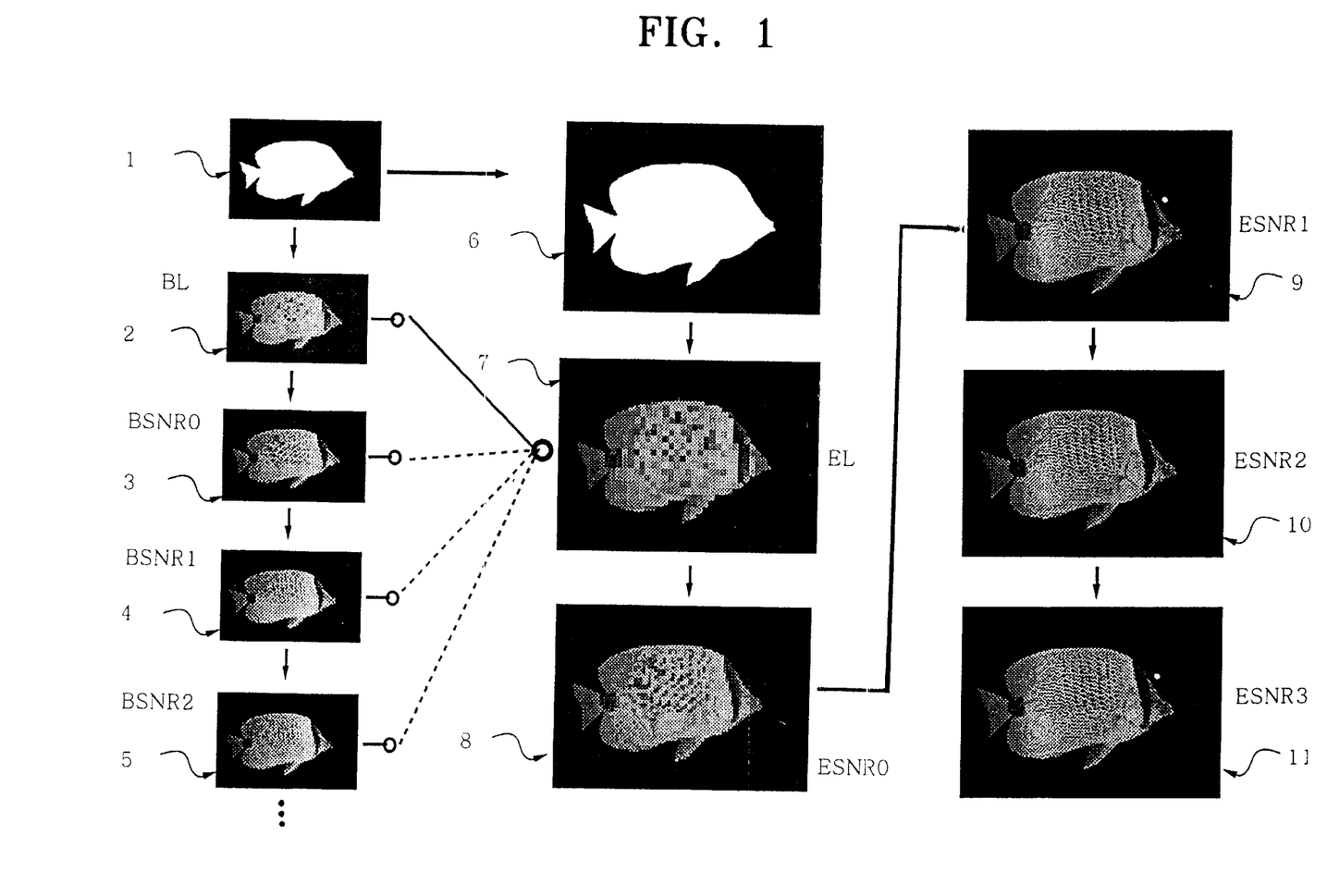
FIG. 1 illustrates the relationships between a spatially scalable architecture and a SNR scalable architecture in an image.

Referring to FIG. 1, a spatially scalable architecture includes a base layer (BL) and an enhancement layer (EL). A SNR scalable architecture includes a plurality of layers the hierarch of which depends on the magnitude of the SNRs of each of the layers with respect to each of the BL and the EL. The BL is composed of shape information 1 and basic texture information 2. As further information related to the SNR scalable architecture is added to the BL, the SNR of the BL gradually increases, so that the picture quality of images is sequentially enhanced as shown in BSNR0 3, BSNR1 4 and BSNR2 5. The EL is composed of shape information 6 and texture information 7 which is upsampled from the BL. As further information related to the SNR scalable architecture is added to the BL, the SNR of the BL gradually increases, so that the picture quality of images is sequentially enhanced as shown in ESNR0 8, ESNR1 9, ESNR2 10 and ESNR3 11.

Figure 2:
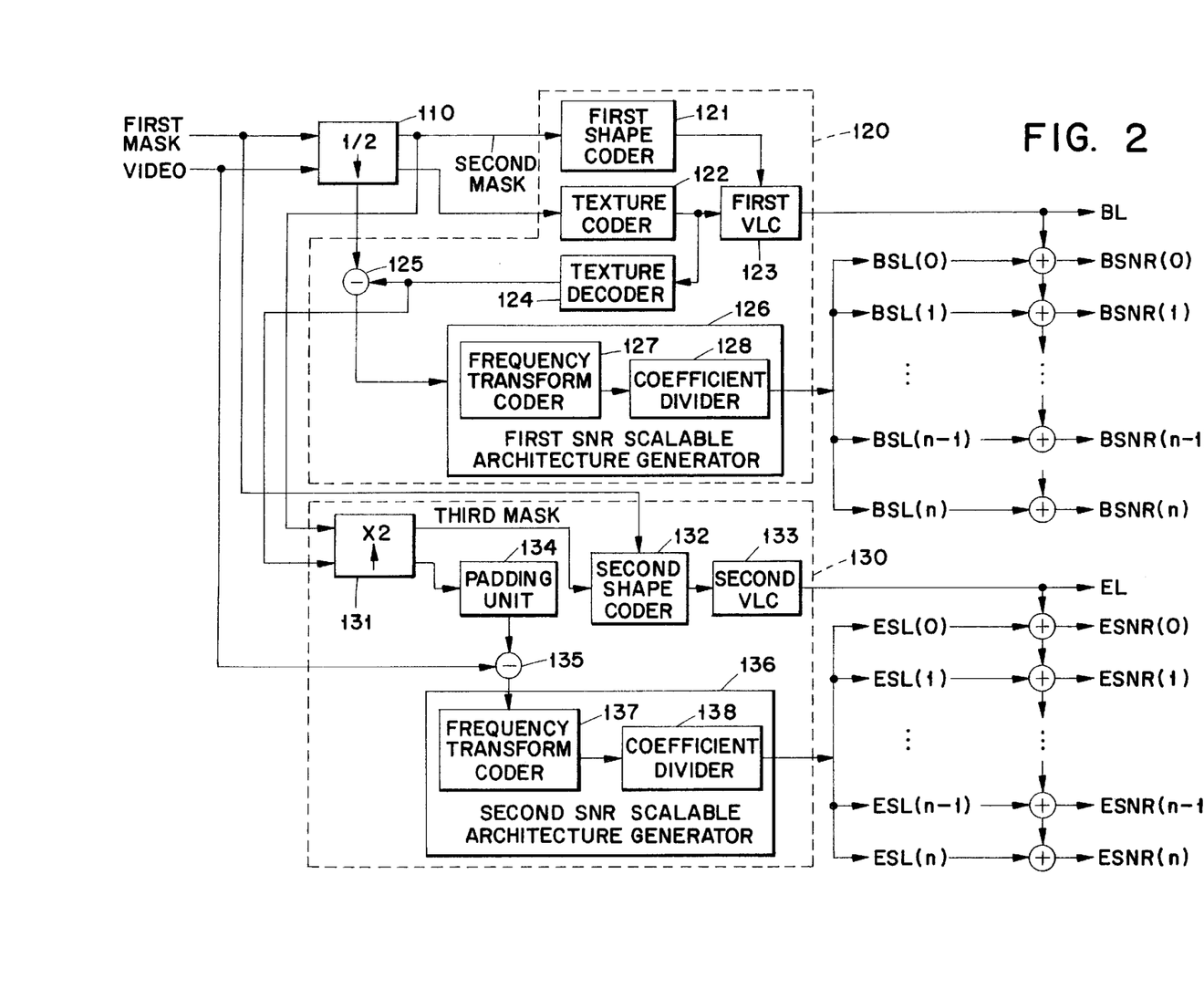
FIG. 2 illustrates the overall configuration of a moving picture coding apparatus having spatially and SNR scalable architectures together according to an embodiment of the present invention.

Referring to FIG. 2, an exemplary embodiment of an apparatus for coding video input data including the shape information and inner texture information of an object based on a spatially scalable architecture and a SNR scalable architecture, includes a down sampling unit 110, a base layer coder 120 and an enhancement layer coder 130. In the embodiment of FIG. 2, the spatially scalable architecture is a two-layer architecture composed of a base layer and an enhancement layer, but the scope of the present invention is not restricted to this embodiment and may include more than two layers.

As shown in FIG. 2, input data includes a first mask, which provides the shape information of an object, and video, which provides the inner texture information of the object. However, when coding an overall image to be displayed on a quadrilateral screen, unlike the coding of an arbitrary shaped object, mask information such a first mask, a second mask or a third mask is not required.

The down sampling unit 110 down samples the magnitude of an input first mask and input video by a half to define a base layer and defines the first mask and video, which is not down sampled, as an enhancement layer. In this embodiment of the present invention, the down sampling unit 110 down samples an original image to a half, but the present invention is not restricted thereto. In another embodiment of the present invention, a down sampling unit may down sample an original image by p/q (here, p and q are integral numbers and q>p) throughout a plurality of layers. In another exemplary embodiment, a down sampling unit may down sample video data composed of shape information and texture information to construct a spatially scalable architecture including a single base layer, which is obtained by down sampling by a ratio, and at least one enhancement layer, which is obtained by down sampling by another ratio that is smaller than that adopted for the base layer.

The texture coder 122 pads the texture information of the base layer, frequency transform codes the padded information and quantizes the frequency transform coded data to code the texture information of the base layer. Padding is preferably performed according to the technology of MPEG-4 video 14496-2. In this embodiment of the present invention, a discrete cosine transform or a discrete wavelet transform is preferably used for the frequency transform coding. Hereinafter, it is assumed that the discrete cosine transform is used for the frequency transform coding.

The first VLC 123 collects and variable length codes the data output from the first shape coder 121 and the texture coder 122 to generate a base layer bitstream BL.

The texture decoder 124 dequantizes data output from the texture coder 122 and inverse frequency transforms the dequantized data to reproduce the texture information of the base layer.

The first difference image generator 125 generates the difference between the texture information reproduced by the texture decoder 124 and the original texture information of the base layer.

The first SNR scalable architecture generator 126 includes a frequency transform coder 127 for frequency transform coding the difference image generated by the first difference image generator 125 and a coefficient divider 128 for dividing the frequency transform coded difference image based on frequency. The first SNR scalable architecture generator 126 generates bitstreams BSL(0), BSL(1), . . . , BSL(n−1) and BLS(n) based on frequency bands. In this embodiment of the present invention, a discrete cosine transformer or a discrete wavelet transformer is preferably used as the frequency transform coder 127.

The enhancement layer coder 130 codes the difference between enhancement layer data and data that has been upsampled from a base layer to an enhancement layer. The enhancement layer coder 130 includes an upsampling unit 131, a second shape coder 132, a second VLC 133, a second difference image generator 135 and a second SNR scalable architecture generator 136.

The upsampling unit 131 upsamples shape information from a base layer to an enhancement layer and upsamples the texture information reproduced by the texture decoder 124 to an enhancement layer.

The second shape coder 132 shape codes the difference between a third mask, which is shape information upsampled from a base layer to an enhancement layer, and the first mask which is shape information of an enhancement layer.

The second VLC 133 variable length codes the output data of the second shape coder 132 to generate an enhancement layer bitstream EL. This embodiment of the present invention preferably includes a padding unit 134 for padding the texture information upsampled to an enhancement layer.

The second difference image generator 135 obtains the difference image between the padded texture information from the padding unit 134 and the texture information of an enhancement layer.

The second SNR scalable architecture generator 136 includes a frequency transform coder 137 for frequency transform coding the difference image generated by the second difference image generator 135 and a coefficient divider 138 for dividing the frequency transform coded difference image based on frequency. The second SNR scalable architecture generator 136 generates bitstreams ESL(0), ESL(1), . . . , ESL(n−1) and ELS(n) based on frequency bands. In this embodiment of the present invention, a discrete cosine transformer or a discrete wavelet transformer is preferably used as the frequency transform coder 137.

Referring to FIG. 2, the bit streams BSL(0), BSL(1), . . . , BSL(n−1) and BSL(n) are sequentially added to the base layer bitstream BL, thereby constructing BSNR(0), BSNR(1), . . . , BSNR(n−1) and BSNR(n), and the bit streams ESL(0), ESL(1), . . . , ESL(n−1) and ESL(n) are sequentially added to the enhancement layer bitstream EL, thereby constructing ESNR(0), ESNR(1), . . . , ESNR(n−1) and ESNR(n).

Figure 3:
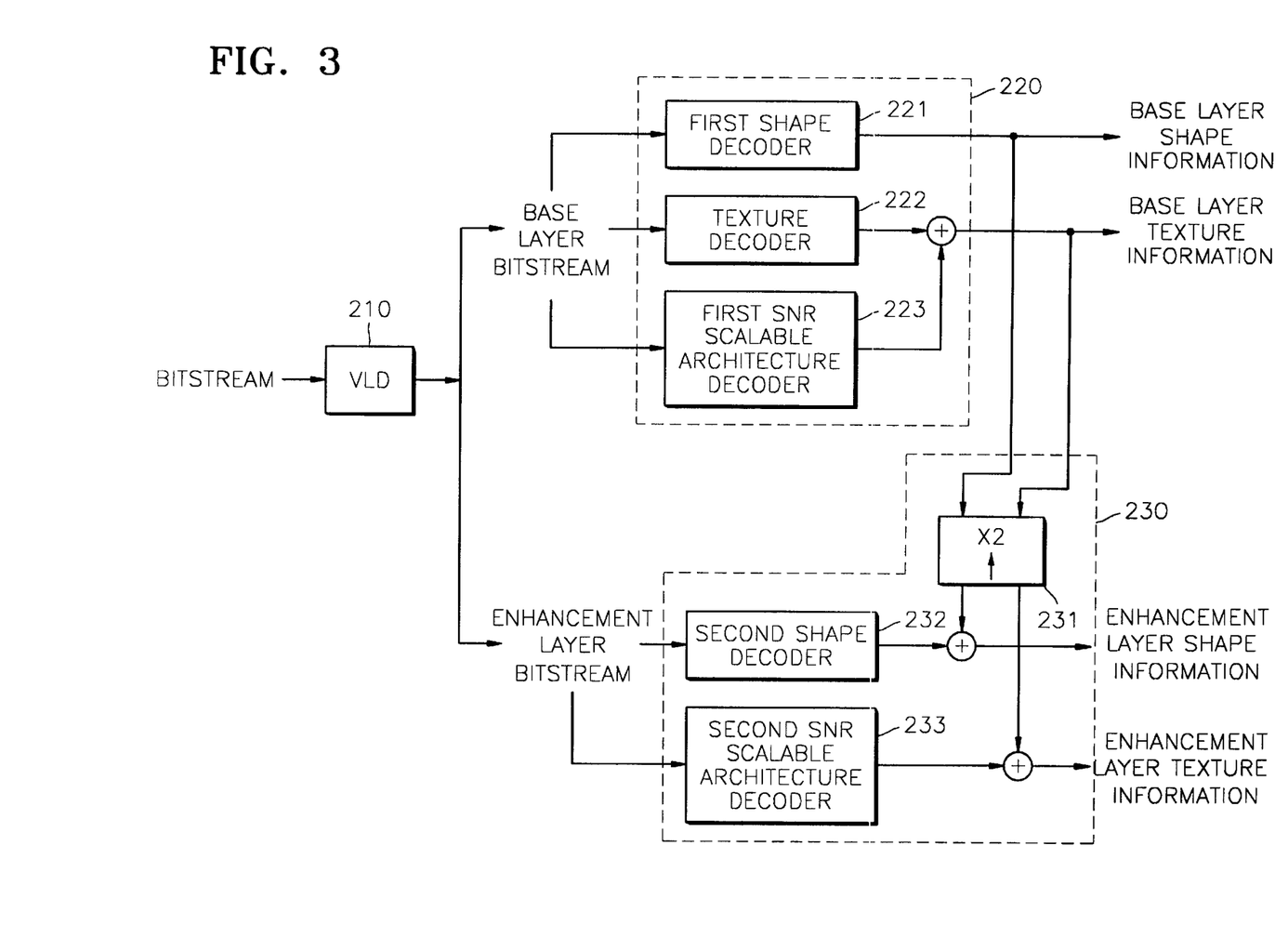
FIG. 3 illustrates the overall configuration of a moving picture decoding apparatus having spatially and SNR scalable architectures together according to an embodiment of the present invention.

Referring to FIG. 3, an embodiment of an apparatus for decoding a bitstream that has been coded based on a spatially scalable architecture and a SNR scalable architecture according to the present invention, includes a variable length decoder (VLD) 210, a base layer decoder 220 and an enhancement layer decoder 230.

The VLD 210 variable length decodes a bitstream that has been coded by an apparatus for coding video input data including the shape information and inner texture information of an object based on a spatially scalable architecture and a SNR scalable architecture, and classifies the bitstream into a base layer bitstream and an enhancement layer bitstream. In the embodiment of FIG. 3, the spatially scalable architecture is a two-layer architecture composed of a base layer and an enhancement layer, but the scope of the present invention is not restricted to this embodiment and may include more than two layers.

The base layer decoder 220 includes a first shape decoder 221, a texture decoder 222 and a first SNR scalable architecture decoder 223. The base layer decoder 220 decodes the base layer bit stream.

The first shape decoder 221 shape decodes coded shape information, which is contained in the base layer bitstream, to reconstruct base layer shape information.

The texture decoder 222 dequantizes coded texture information contained in the base layer bitstream and inverse frequency transforms the dequantized texture information to reconstruct base layer texture information.

The first SNR scalable architecture decoder 223 sequentially inverse frequency transforms bitstreams selected from a SNR scalable architecture contained in the base layer bitstream and sequentially adds the inverse frequency transformed bitstreams to the base layer texture information, thereby improving the picture quality of the base layer.

The enhancement layer decoder 230 includes an upsampling unit 231, a second shape decoder 232 and a second SNR scalable architecture decoder 233. The enhancement layer decoder 230 decodes the enhancement bitstream.

The upsampling unit 231 upsamples to an enhancement layer, the shape information of a layer immediately below an enhancement layer in a spatially scalable architecture and the texture information of the uppermost SNR scalable layer of the layer immediately below the enhancement layer in the spatially scalable architecture. In the embodiment of the present invention shown in FIG. 3 having two layers in a spatially scalable architecture, the layer immediately below the enhancement layer is the base layer. In this embodiment, the upsampling unit 231 upsamples an original image by two times, but the present invention is not restricted thereto. In another embodiment of the present invention, an upsampling unit may upsample an original image by p/q (here, p and q are integral numbers and q<p) throughout a plurality of layers.

The second shape decoder 232 shape decodes the shape information of the enhancement layer contained in the enhancement layer bitstream to generate a fifth mask and adds the fifth mask to the upsampled shape information of the lower layer to reconstruct enhancement layer shape information.

The second SNR scalable architecture decoder 233 sequentially inverse frequency transforms bitstreams selected from a SNR scalable architecture of the enhancement layer bitstream and adds the inverse frequency transformed bitstreams to the upsampled texture information of the lower layer.

The following description concerns the principle of operation of the present invention. Referring to FIG. 2, the input first mask and the input video are down sampled to images of ½ of the size of an original image. Accordingly, the first mask becomes the second mask and then the second mask is compressed by the first shape coder 121. The down sampled video information is padded into a shape, thereby becoming a padded image. The padded image is frequency transform coded by a discrete cosine transformation (DCT) circuit (not shown), which is a kind of a frequency transform coder, and quantized by a quantizer (not shown). The DCT circuit and the quantizer are included in the texture coder 122.

The quantized frequency coefficients with previously coded shape information are generated as a base layer bitstream BL by the first VLC 123. The base layer bitstream forms a fundamental image having a lowest resolution.

The frequency coefficients quantized by the quantizer are processed by a dequantizer (not shown) and an inverse discrete cosine transform circuit (not shown), which is a frequency transform coding apparatus, to thus, reproduce base layer texture information.

Next, the difference between the reproduced base layer texture information and original base layer texture information is obtained. Thereafter, the difference image is discrete cosine transformed by the frequency transform coder 127. The DCT coefficients are classified into BSL(0), BSL(1), . . . , BSL(n−1) and BSL(n) by the coefficient divider 128 according to a predetermined frequency band.

Figures 4A, 4B:
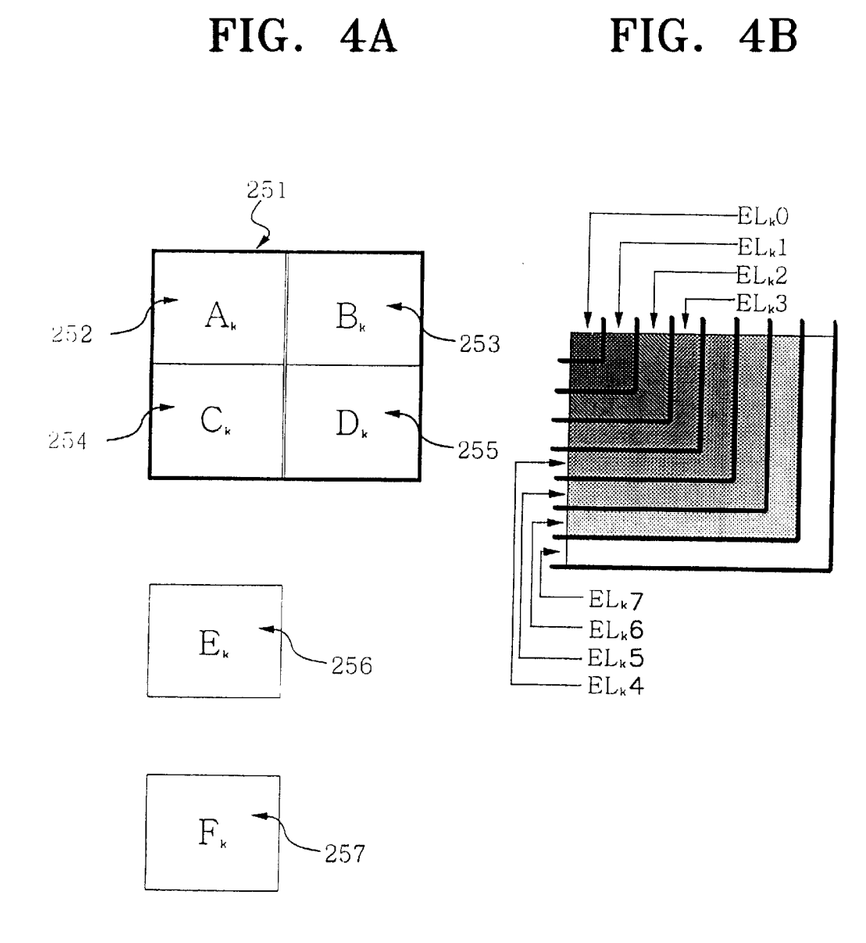
FIGS. 4A through 4C illustrate processes of implementing a SNR scalable architecture using division of frequency bands.

The following description concerns an example of constructing frequency bands. Referring to FIG. 4A, an arbitrary area of an image is divided into macroblocks of N×N pixels. Next, with respect to each macroblock 251, the output data of a frequency transform coder is classified by frequency bands.

For example, when an arbitrary macroblock k is classified, the classification is performed with respect to N×N luminance component data 251 and N/2×N/2 chrominance component data 256 and 257. The luminance component data 251 is composed of four sub-blocks 252, 253, 254 and 255. In each sub-block, the data is classified by frequency bands. The data of the same frequency band in the macroblock constructs a single macro band data. The chrominance component data 256 and 257 is also classified by frequency bands. The chrominance component data and of a certain frequency band is added to macro band data of the same frequency band, thereby forming a frequency band group $MEL_k$ of each frequency band with respect to a unit block.

FIG. 4A shows the block structure of luminance component data and chrominance component data. FIG. 4B shows the classification of coefficients, after they have been processed by a frequency transform coder, by frequency bands with respect to a unit block. It can be seen that the coefficients can be sorted into groups of eight different frequency bands $EL_k0$, $EL_k1$, . . . and $EL_k7$.

Figure 4C:
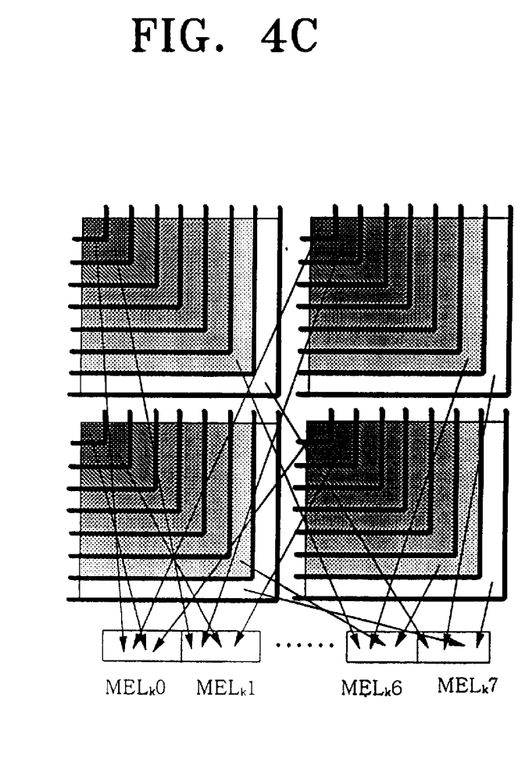
Figure 6:
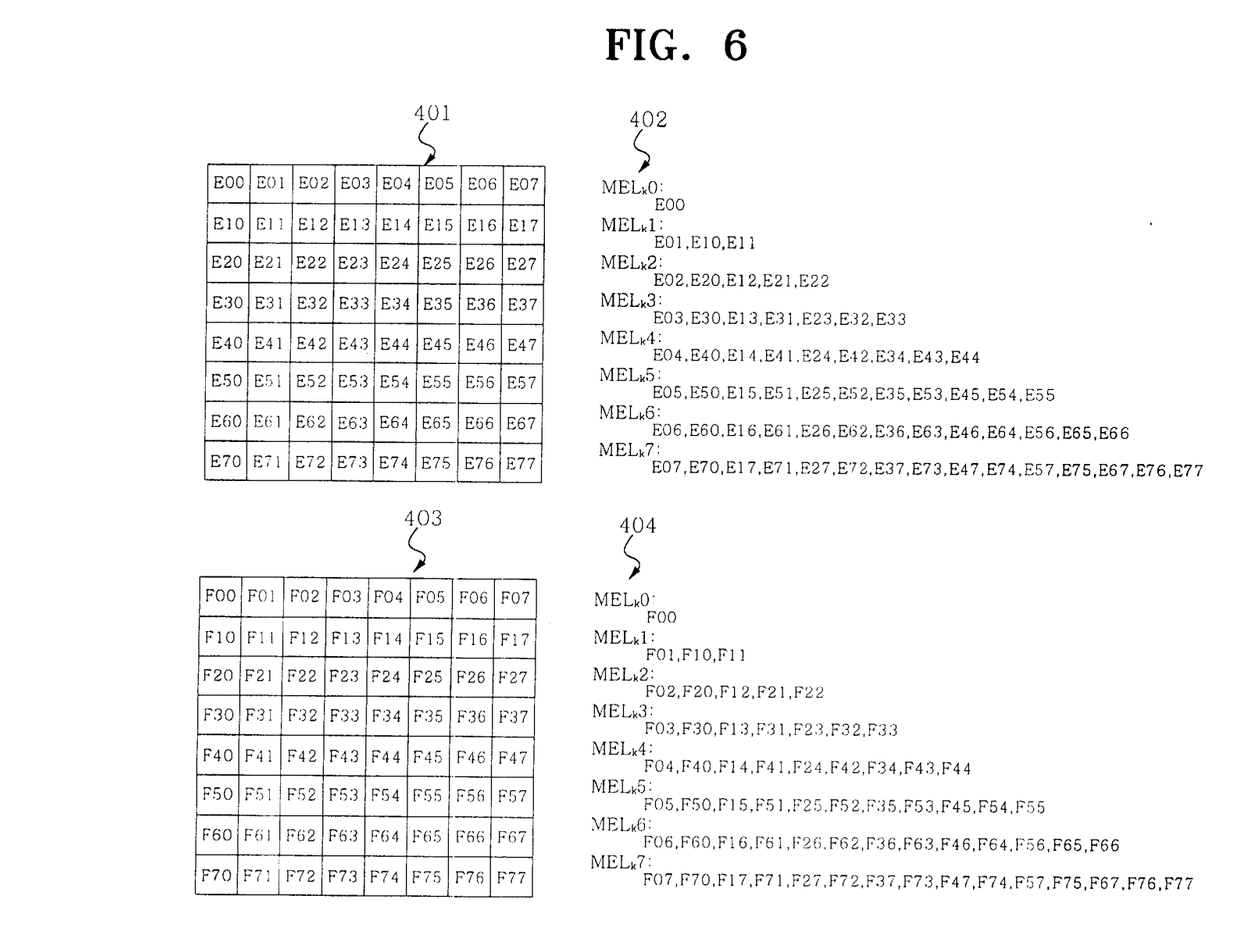
FIG. 6 illustrates sets of frequency components constructing layers of chrominance information.

FIG. 4C shows the procedure of forming a unit band group by grouping coefficients in the four sub-blocks of luminance component data by frequency bands. The luminance component data of each sub-block is in the same unique position in each frequency band group $MEL_k$. The coefficients of direct current (DC) in the macro band data are sorted into a frequency band group $MEL_k0$. The alternating current (AC) coefficients of the most significant low frequency component in the macro band data are sorted into a frequency band group $MEL_k1$. The alternating current (AC) coefficients of the last frequency band in the macro band data are sorted into a frequency band group $MEL_k7$. The structures of the coefficients of different frequency bands are shown in FIGS. 5 and 6.

Referring to FIG. 5, when the luminance component data of four sub-blocks 301, 302, 303 and 304, each of which has eight scalable architectures, is rearranged according to frequency components in units of sub-blocks, eight layers $MEL_k0$, $MEL_k1$, . . . , $MEL_k7$ are constructed. FIG. 6 shows the coefficient structures 402 and 404 of two chrominance components Cr 401 and Cb 403 based on frequency components. Similarly to the luminance component, the frequency coefficients of each chrominance component construct eight layers $MEL_k0$, $MEL_k1$, . . . , $MEL_k7$.

As described above, a scalable architecture is first created with respect to each arbitrary sub-block. Next, data in all sub-blocks is classified into groups by frequency band, thereby creating a scalable architecture with respect to an overall picture. This scalable architecture is shown as BSL (0), BSL(1), . . . and BSL(n).

Figure 7:
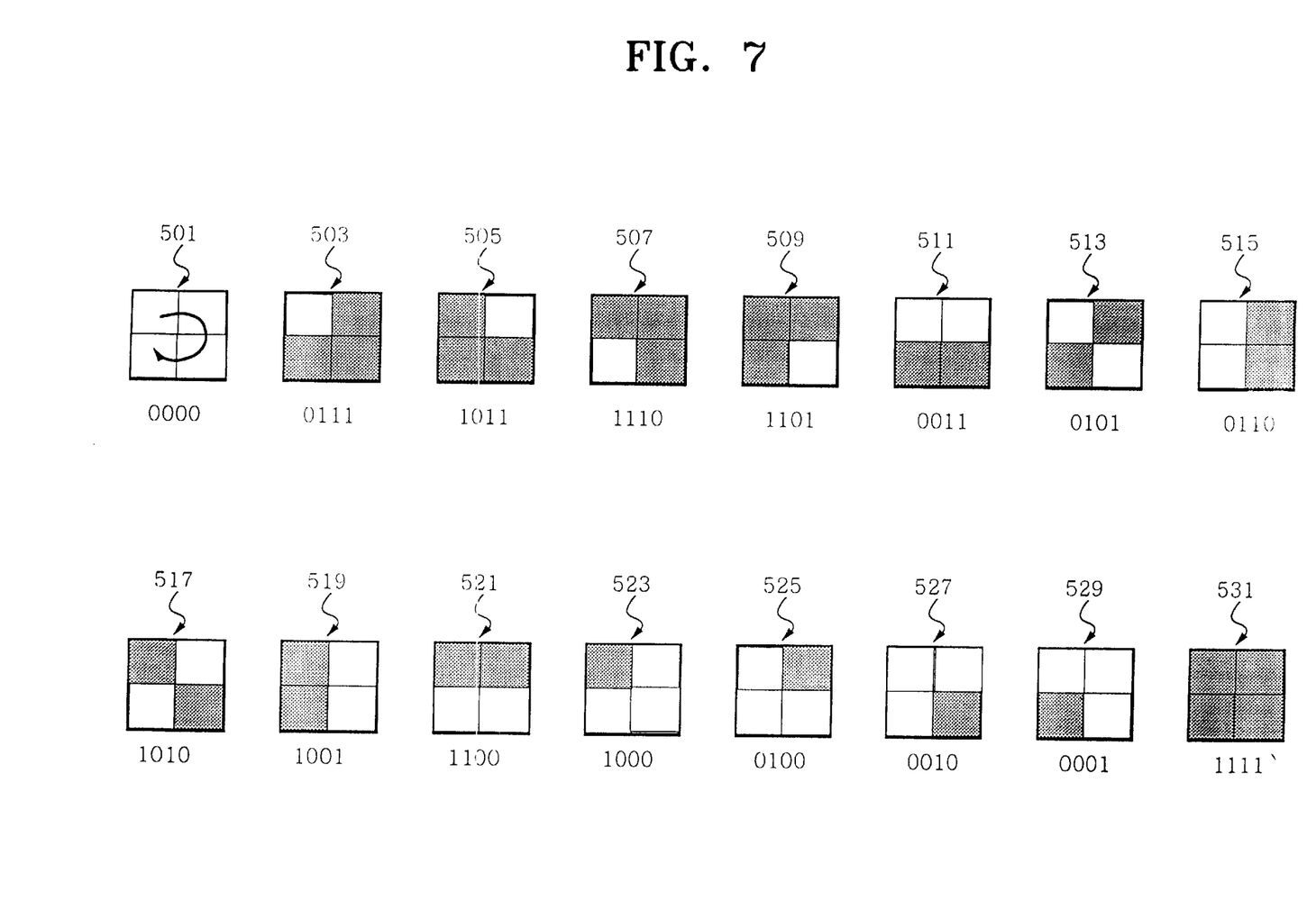
FIG. 7 illustrates an example of composite of codes representing the type of information, which corresponds existence/non-existence of shape information.

When processing an arbitrary shape, it should be known that a sub-block is in the shape, at the boundary of the shape or outside the shape. As shown in FIG. 7, position states of four sub-blocks of luminance information are each represented by four-bit data to easily inform blocks corresponding to shape information based on an agreement on the four-bit data. As shown in reference numeral 501 of FIG. 7, when all the sub-blocks are outside of a shape, a position state is represented by "0000". As shown in reference numeral 503, when only the top left sub-block is outside of a shape, a position state is represented by "0111". As shown in reference numeral 531, when all the sub-blocks are inside of a shape, a position state is represented by "1111". Accordingly, the blocks to which data in each layer belongs can be known. When shape information exists in at least one sub-block of a luminance component macroblock, it is determined that chrominance component data corresponding to the luminance component macroblock exists. In this way, a bitstream having a SNR scalable architecture with n layers is reproduced with respect to a spatial base layer.

Referring back to FIG. 2, the second mask is extended by the upsampling unit 131 by two times to generate the third mask. The difference between the third mask and the first mask is shape coded by the second shape coder 132 and then variable length coded by the second VLC 133, thereby constructing an enhancement layer.

Texture information reproduced by the texture decoder 124 is extended by the upsampling unit 131 by two times. A padded image is created from the extended area and subtracted from the input video which is an original image. The same processes as for the base layer are performed on the difference value obtained from the subtraction, to thereby generate ESL(0), ESL(1), . . . and ESL(n). Consequently, bitstreams having spatially and SNR scalable architectures can be produced.

A procedure of decoding bitstreams generated through the procedure as described above is shown in FIG. 3. As shown in FIG. 3, an input bitstream is divided into a base layer bitstream and an enhancement layer bitstream by the VLD 210. The base layer bitstream is divided into shape information and texture information. The shape information is decoded by the first shape decoder 221 to generate a fourth mask which becomes base layer shape information. Coded base layer texture information contained in the base layer bitstream is dequantized and inverse frequency transformed to produce base layer texture information. The bitstreams from a first layer to a selected layer in the SNR scalable architecture of the base layer bitstream are sequentially inverse frequency transformed and then added to the base layer texture information. As a result, decoding of the base layer is completed.

When an enhancement layer bitstream exists, similarly, the enhancement layer is divided into shape information and texture information. The shape information is decoded by the second shape decoder 232 to generate a fifth mask. The fifth mask is added to information which is obtained by extending by two times the fourth mask, which is the shape information reproduced from the base layer, to thus, generate enhancement layer shape information. The bitstreams from a first layer to a selected layer in the SNR scalable architecture of the enhancement layer bitstream are sequentially inverse frequency transformed and then added to information obtained from the upsampling unit 230 which enlarges by two times texture information reproduced from the base layer, to thus, generate enhancement layer texture information. As a result, decoding of the enhancement layer is completed. Consequently, a receiving terminal can reproduce an image having multiple spatially and SNR scalable architectures.

According to the present invention, various picture quality information of a different size can be provided with respect to an arbitrary shaped object through a single bitstream. More specifically, base layer information having base picture quality is reproduced using minimum information, and then variously subdivided bitstreams are formed, thereby changing the picture quality of a reproduced image to be suitable for the performance of a transmission line or a receiving terminal. Moreover, the present invention is implemented such that similar operations can be repeatedly performed on an enhancement layer which is extended in a spatial domain, thereby providing various picture quality information depending on a change in resolution.

In addition, since the present invention can perform coding/decoding with respect to an arbitrary shaped object, a special picture quality service can be provided with respect to an arbitrary shaped object displayed on a screen. That is, quality of service (QOS), in which a user or a provider can determine the picture quality of an object, is realized.

Although the invention has been described with reference to particular embodiments, it will be apparent to one of ordinary skill in the art that modifications of the described embodiment may be made without departing from the spirit and scope of the invention. The embodiments of the present invention should be construed in descriptive sense only and not for purposes of limitation. The scope of the invention is set fourth in the following claims.

What is claimed is:

1. A moving picture coding method having both a spatially scalable architecture and a signal-to-noise ratio (SNR) scalable architecture, wherein input video data composed of shape information and inner texture information of an object is constructed to have spatially and SNR scalable architectures and then coded, the method comprising the steps of:

(a) down sampling the shape information and the texture information by a predetermined ratio to construct a spatially scalable architecture including a single base layer and at least one enhancement layer;

(b) coding the shape and texture information of the base layer to generate a base layer bitstream, frequency transform coding the difference between decoded texture information and original texture information, and constructing a SNR scalable architecture based on frequency bands; and (c) with respect to each of the at least one enhancement layer, coding the difference between shape information upsampled from the base layer and the shape information of the enhancement layer to generate an enhancement layer bitstream, frequency transform coding the difference between the decoded texture information obtained in the step (b) and the texture information of the enhancement layer, and constructing a SNR scalable architecture based on frequency bands.

2. A moving picture coding method having both a spatially scalable architecture and a signal-to-noise ratio (SNR) scalable architecture, wherein input video data composed of shape information and inner texture information of an object is constructed to have spatially and SNR scalable architectures and then coded, the method comprising the steps of:

(a) down sampling the shape information and the texture information to construct a spatially scalable architecture including a single base layer, which is obtained by down sampling by a first ratio, and at least one enhancement layer, which is obtained by down sampling by a second ratio that is smaller than the first ratio;

(b) with respect to the shape information and texture information of the base layer, (b1) shape coding the shape information of the base layer;

(b2) padding, frequency transform coding and quantizing the texture information of the base layer;

(b3) collecting and variable length coding the data generated in the steps (b1) and (b2) to generate a base layer bitstream;

(b4) obtaining the difference between texture information reproduced by dequantizing and inverse frequency transforming the data generated in the step (b2) and the texture information of the base layer;

(b5) frequency transform coding the difference obtained in the step (b4) and classifying the results of the frequency transform coding by frequency to generate bitstreams based on frequency bands;

(c) with respect to the shape and texture information of each enhancement layer, (c1) shape coding and variable length coding the difference between the shape information of the enhancement layer and shape information obtained by upsampling the shape information of the base layer to the enhancement layer, to generate an enhancement layer bitstream;

(c2) obtaining the difference between the texture information of the enhancement layer and texture information obtained by upsampling the texture information reproduced in the step (b4) to the enhancement layer and padding the result of the upsampling; and (c3) frequency transform coding the difference obtained in the step (c2) and classifying the results of the frequency transform coding by frequency to generate bitstreams based on frequency bands.

3. The method of claim 2, wherein in the steps (b1) and (b2), the coding of the shape information is scalable shape coding based on scan interleaving.

4. The method of claim 2, wherein the frequency transform coding is performed by a discrete cosine transform.

5. The method of claim 2, wherein the frequency transform coding is performed by a discrete wavelet transform.

6. The method of claim 4, wherein in the steps (b5) and (c3), a luminance signal of the difference is divided into macroblocks of N×N pixels, each macroblock is divided into four sub-blocks, the luminance signal is discrete cosine transformed and classified by a predetermined number of frequency bands in units of sub-blocks, and chrominance signals of the difference are each divided into blocks of N/2×N/2 corresponding to the macroblocks of the luminance signal, respectively, each chrominance signal is discrete cosine transformed and classified by a predetermined number of frequency bands in units of blocks, wherein N is a predetermined integral number larger than 2, wherein the discrete cosine transformed luminance signal is recombined with the discrete transformed chrominance signals based on the predetermined number of frequency bands in a SNR scalable architecture.

7. The method of claim 6, wherein the recombination based on the frequency bands is performed in units of macroblocks of the luminance signal.

8. The method of claim 6, wherein the recombination based on the frequency bands is performed in an overall image unit.

9. The method of claim 6, wherein each layer in the SNR scalable architecture constructed through the recombination based on the frequency bands is coded by a predetermined method.

10. The method of claim 6, wherein the discrete cosine transform is only performed on sub-blocks or blocks which have shape information.

11. A moving picture coding apparatus having both a spatially scalable architecture and a signal-to-noise ratio (SNR) scalable architecture, wherein input video data composed of shape information and inner texture information of an object is constructed to have spatially and SNR scalable architectures and then coded, the apparatus comprising:

a down sampling unit for down sampling the shape information and the texture information to construct a spatially scalable architecture including a single base layer, which is obtained by down sampling by a first ratio, and at least one enhancement layer, which is obtained by down sampling by a second ratio that is smaller than the first ratio;

a base layer coder comprising a first shape coder for shape coding the shape information of the base layer; a texture coder for padding, frequency transform coding and quantizing the texture information of the base layer; a first variable length coder for collecting and variable length coding the data output from the first shape coder and the texture coder, to generate a base layer bitstream; a texture decoder for dequantizing and inverse frequency transforming the data output from the texture coder, to reproduce texture information; a first difference image generator for generating the difference between the reproduced texture information from the texture decoder and the texture information of the base layer; and a first SNR scalable architecture generator for frequency transform coding the difference generated by the first difference image generator and classifying the results of the frequency transform coding by frequency, to generate bitstreams based on frequency bands; and at least one enhancement layer coder comprising an upsampling unit for upsampling the shape information of the base layer to the enhancement layer and upsampling the texture information reproduced by the texture decoder to the enhancement layer; a second shape coder for shape coding the difference between the upsampled shape information and the shape information of the enhancement layer; a second variable length coder for variable length coding the output data of the second shape coder to generate an enhancement layer bitstream; a second difference image generator for obtaining the difference between the texture information of the enhancement layer and texture information obtained by padding the output data of the upsampling unit; and a second SNR scalable architecture generator for frequency transform coding the difference generated by the second difference image generator and classifying the results of the frequency transform coding by frequency to generate bitstreams based on frequency bands.

12. The apparatus of claim 11, wherein each of the first and second shape coders is a scalable shape coder based on scan interleaving.

13. The apparatus of claim 11, wherein the texture coder, each of the first SNR scalable architecture generator and the second SNR scalable architecture generator includes a discrete cosine transformer.

14. The apparatus of claim 11, wherein each of the texture coder, the first SNR scalable architecture generator and the second SNR scalable architecture generator includes a discrete wavelet transformer.

15. The apparatus of claim 13, wherein each of the first and second SNR scalable architecture generators divides the luminance signal of the difference into macroblocks of N×N pixels, divides each macroblock into four sub-blocks, and discrete cosine transforms and classifies the luminance signal by a predetermined number of frequency bands in units of sub-blocks, each of the first and second SNR scalable architecture generators divides each of chrominance signals of the difference into blocks of N/2×N/2 corresponding to the macroblocks of a luminance signal, respectively, and discrete cosine transforms and classifies each chrominance signal by a predetermined number of frequency bands in units of blocks, wherein N is a predetermined integral number larger than 2, and each of the first and second SNR scalable architecture generators recombines the discrete cosine transformed luminance signal with the discrete transformed chrominance signals based on the predetermined number of frequency bands in a SNR scalable architecture.

16. The apparatus of claim 15, wherein each of the first and second SNR scalable architecture generators discrete cosine transforms only sub-blocks or blocks which have shape information.

17. A moving picture decoding method having both a spatially scalable architecture and a signal-to-noise ratio (SNR) scalable architecture, wherein a bitstream, which has been coded in spatially and SNR scalable architectures, is decoded, the method comprising the steps of:

(a) variable length decoding the bitstream to divide it into a base layer bitstream and at least one enhancement layer bitstream;

(b) shape decoding coded shape information contained in the base layer bitstream to generate base layer shape information;

(c) dequantizing and inverse frequency transforming coded texture information contained in the base layer bitstream to generate base layer texture information;

(d) sequentially inverse frequency transforming bitstreams selected from the SNR scalable architecture of the base layer bitstream and adding the results to the base layer texture information; and (e) with respect to at least one selected enhancement layer, sequentially repeating the steps of:

(e1) upsampling the shape information of a spatial reference layer to the enhancement layer;

(e2) upsampling the texture information of a SNR reference layer which falls under a spatial reference layer;

(e3) shape decoding enhancement layer shape information contained in the enhancement layer bitstream and adding the result to the upsampled shape information of a lower layer; and (e4) sequentially inverse frequency transforming bitstreams selected from the SNR scalable architecture of the enhancement layer bitstream and adding the results to the upsampled texture information of the lower layer.

18. The method of claim 17, further comprising the step of previously decoding a spatial reference layer identifier before the step (e1).

19. The method of claim 18, further comprising the step of previously decoding a SNR reference layer identifier before the step (e1).

20. The method of claim 17, wherein the spatial reference layer is a layer immediately below the enhancement layer.

21. The method of claim 20, wherein the SNR reference layer is a SNR base layer which falls under the spatial reference layer.

22. The method of claim 20, wherein the SNR reference layer is a highest SNR layer which falls under the spatial reference layer.

23. A moving picture decoding apparatus having both a spatially scalable architecture and a signal-to-noise ratio (SNR) scalable architecture, wherein a bitstream, which has been coded in spatially and SNR scalable architectures, is decoded, the apparatus comprising:

a variable length decoder for variable length decoding the bitstream to divide it into a base layer bitstream and at least one enhancement layer bitstream;

a base layer decoder comprising a first shape decoder for shape decoding coded shape information contained in the base layer bitstream to generate base layer shape information; a texture decoder for dequantizing and inverse frequency transforming coded texture information contained in the base layer bitstream to generate base layer texture information; and a first SNR scalable architecture decoder for sequentially inverse frequency transforming selected bitstreams in the SNR scalable architecture of the base layer bitstream and adding the results to the base layer texture information; and at least one enhancement layer decoder comprising an upsampling unit for upsampling the shape and texture information of a layer immediately below the enhancement layer in a spatially scalable architecture, to the enhancement layer; a second shape decoder for shape decoding enhancement layer shape information contained in the enhancement layer bitstream and adding the result to the upsampled shape information of a lower layer; and a second SNR scalable architecture decoder for sequentially inverse frequency transforming bitstreams selected from the SNR scalable architecture of the enhancement layer bitstream and adding the results to the upsampled texture information of the lower layer.

* * * * *